US008938459B2

(12) United States Patent
Garbe

(10) Patent No.: US 8,938,459 B2
(45) Date of Patent: Jan. 20, 2015

(54) SYSTEM AND METHOD FOR DISTRIBUTED INDEX SEARCHING OF ELECTRONIC CONTENT

(71) Applicant: Wolf Garbe, London (GB)

(72) Inventor: Wolf Garbe, London (GB)

(*) Notice: Subject to any disclaimer, the term of this patent is extended or adjusted under 35 U.S.C. 154(b) by 0 days.

(21) Appl. No.: 13/744,635

(22) Filed: Jan. 18, 2013

(65) Prior Publication Data

US 2013/0138660 A1 May 30, 2013

Related U.S. Application Data

(62) Division of application No. 12/578,561, filed on Oct. 13, 2009, now Pat. No. 8,359,318.

(60) Provisional application No. 61/104,848, filed on Oct. 13, 2008.

(51) Int. Cl.
*G06F 7/00* (2006.01)
*G06F 17/30* (2006.01)

(52) U.S. Cl.
CPC ........ *G06F 17/30011* (2013.01); *G06F 17/301* (2013.01); *G06F 17/30206* (2013.01); *G06F 17/30861* (2013.01)
USPC ........... 707/747; 707/622; 707/636; 707/748; 707/752; 707/756

(58) Field of Classification Search
CPC .................. G06F 17/30206; G06F 17/30289; G06F 17/30312
USPC .......... 707/622, 636, 742, 748, 752, 754, 756
See application file for complete search history.

(56) References Cited

U.S. PATENT DOCUMENTS

| 4,843,389 | A | * | 6/1989 | Lisle et al. | 341/106 |
|---|---|---|---|---|---|
| 6,026,429 | A | * | 2/2000 | Jones et al. | 709/201 |
| 7,409,406 | B2 | * | 8/2008 | Agrawal et al. | 707/742 |
| 7,711,727 | B2 | * | 5/2010 | Agrawal et al. | 707/711 |
| 7,849,063 | B2 | * | 12/2010 | Stata et al. | 707/696 |
| 2002/0040363 | A1 | * | 4/2002 | Wolfman et al. | 707/5 |
| 2008/0195597 | A1 | * | 8/2008 | Rosenfeld et al. | 707/5 |
| 2009/0150375 | A1 | * | 6/2009 | Mityagin et al. | 707/5 |
| 2010/0145918 | A1 | * | 6/2010 | Stata et al. | 707/696 |

* cited by examiner

*Primary Examiner* — Cheyne D Ly
(74) *Attorney, Agent, or Firm* — Allen J. Moss; Squire Patton Boggs (US) LLP

(57) ABSTRACT

There are provided methods and systems for efficient search in a peer-to-peer network topology. In various embodiments, search methods and systems provide for response times and network traffic that are independent from the number of query terms, thereby producing constant run-time searches and bandwidth hits in a P2P network search implementation. By distributing inverse indexes between peers, and storing with each inverse index a Bloom filter populated with selected keywords, multi-term search and analysis can be conducted on one network node without requiring exchange of posting lists between various network nodes.

11 Claims, 14 Drawing Sheets

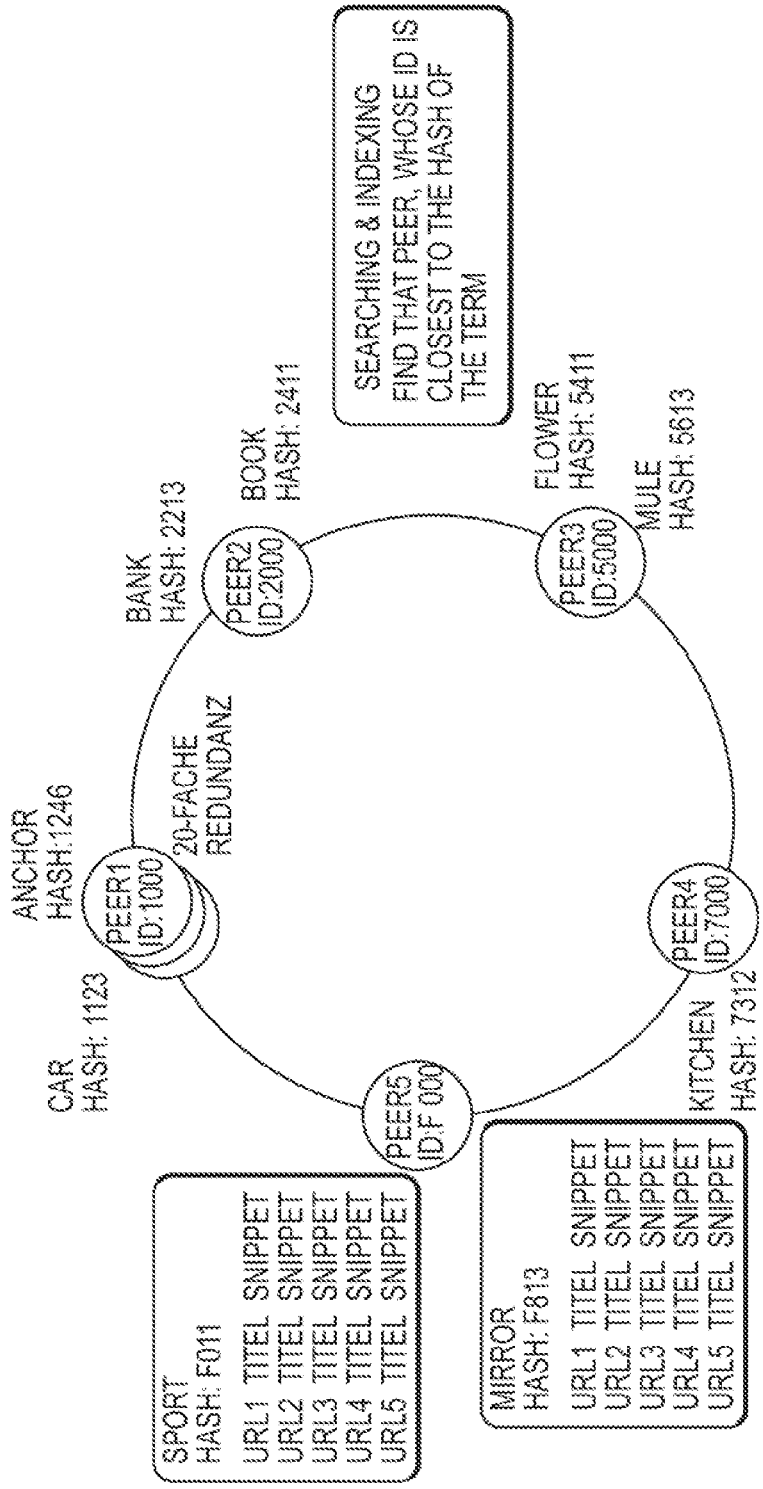

Distributed Index

| Peer "designed" | Peer "engine" | Peer "information" | Peer "search" | Peer "tool" | Peer "web" | Peer "wide" | Peer "world" |
|---|---|---|---|---|---|---|---|
| document1.com | document1.com | document1.com | document1.com | document1.com | document1.com | document1.com | document1.com |
| designed | designed | designed | designed | designed | designed | designed | designed |
| engine | engine | engine | engine | engine | engine | engine | engine |
| information | information | information | information | information | information | information | information |
| search | search | search | search | search | search | search | search |
| tool | tool | tool | tool | tool | tool | tool | tool |
| web | web | web | web | web | web | web | web |
| wide | wide | wide | wide | wide | wide | wide | wide |
| world | world | world | world | world | world | world | world |

FIGURE 7

Keywords

| Peer "designed" | Peer "engine" | Peer "information" | Peer "search" | Peer "tool" | Peer "web" | Peer "wide" | Peer "world" |
|---|---|---|---|---|---|---|---|
| Document_1.com<br>Document_2.com<br>Document_3.com | Document_1.com<br>Document_2.com<br>Document_3.com<br>Document_4.com<br>Document_k-3.com<br>Document_k-2.com<br>Document_k-1.com<br>Document_k.com | Document_1.com<br>Document_2.com<br>Document_3.com<br>Document_4.com | Document_1.com<br>Document_2.com<br>Document_3.com<br>Document_4.com<br>Document_k-3.com<br>Document_k-2.com<br>Document_k-1.com<br>Document_k.com | Document_1.com<br>Document_2.com<br>Document_3.com<br>Document_4.com | Document_1.com<br>Document_2.com<br>Document_3.com<br>Document_4.com<br>Document_k-3.com<br>Document_k-2.com<br>Document_k-1.com<br>Document_k.com | Document_1.com<br>Document_2.com<br>Document_3.com | Document_1.com<br>Document_2.com |

Only the keyword "engine", "search" and "web" are used for calculating combinations, because they have already top-k documents stored.

Keyword Combinations

| Peer "engine search" | Peer "search web" | Peer "engine web" |
|---|---|---|
| Document_1.com<br>Document_2.com<br>Document_3.com | Document_1.com<br>Document_2.com<br>Document_3.com<br>Document_4.com | Document_1.com<br>Document_2.com<br>Document_3.com<br>Document_4.com |

The keyword combination "engine search web" is not created, because it contains shorter key word combinations with less than top-k most relevant pages stored in the index.

FIGURE 13

SYSTEM AND METHOD FOR DISTRIBUTED INDEX SEARCHING OF ELECTRONIC CONTENT

CROSS REFERENCE TO RELATED APPLICATIONS

This application is a divisional of and claims priority to U.S. Utility application Ser. No. 12/578,561 filed Oct. 13, 2009 titled, "System and Method for Distributed Index Searching of Electronic Content," which claims priority to U.S. Provisional Patent Application No. 61/104,848, filed Oct. 13, 2008 titled "System and Method for Searching for Electronic Content," the disclosure of which is fully incorporated herein by reference for all purposes.

BACKGROUND

1. Field of the Invention

The invention pertains generally to the field of automated searching for electronic information content in computer networks, and more particularly, to efficient indexing and searching of information in a peer-to-peer computer network topology.

2. Background of the Invention

As computer networks have become nearly ubiquitous in all computer environments, the amount of information available for access and use by computer users has correspondingly exploded. Yet with billions of pages of information available to users of networks such as the Internet, without the ability to efficiently locate information, the available information is all but useless. Thus, automated search resources such as the Google and Yahoo internet search engines were developed to assist users in locating relevant information from a vast number of possible storage locations in a reasonable amount of time. Conventional search engines usually reduce search time by pre-indexing documents that are accessible to the network and applying user search criteria against the index to obtain search hits.

Typical document indexing systems have term occurrence data arranged in an inverted content index partitioned by document. The data is distributed over multiple computer systems that are dedicated to index storage with each computer system handling a subset of the total set of documents that are indexed. This allows for a word search query to be presented to a number of computer systems at once with each computer system processing the query with respect to the documents that are handled by the computer system.

An inverted word location index partitioned by document is generally more efficient than an index partitioned by word. This is because partitioning by word becomes expensive when it is necessary to rank hits over multiple words. Large amounts of information are exchanged between computer systems for words with many occurrences. Therefore, typical document index systems are partitioned by document and queries on the indexed documents are processed against the contents of the indexes until a sufficient results set is obtained. While the number of documents indexed in search engines is growing, in many cases the results for most queries come from a small portion of the entire set of documents. Therefore it may be inefficient to search indexes that contain documents that are less likely to return results in response to a query.

Peer-to-peer network topology (P2P) is well known in the computer world, and may be implemented in a hard-wired configuration, or, as more popularly implemented, in a virtual manner by overlaying a peer network configuration over a physical or native network topology. In a peer to peer network, each computer (also called a "peer," or "node") in the network has the same or similar responsibilities as each of the others, i.e. it is a "peer" rather than a merely client or server, and is physically or virtually connected to all other nodes in the network (see FIG. 1A). In P2P networks, all clients provide resources, which may include bandwidth, storage space, and computing power. Such networks are dynamically scalable; as nodes arrive and demand on the system increases, the total capacity of the system also increases. Many variations of P2P networks have been created, and popular examples include Napster, Kazaa, and Gnutella. Such P2P networks were often first used to disseminate large amounts of multimedia data such as movies or music over the Internet.

The distributed computing power and storage aspects of P2P networks provides great advantages in marshalling the resources of multiple computers for storage and processing. However, in such networks, the computing elements (nodes) are not always in a close geographic proximity and they are not always connected by high bandwidth connections. Further, the storage capacity of node in the network varies dramatically, and in some instances may be severely limited.

P2P web search engines, through the P2P network interface, utilize the resources of each of the network nodes, and may make efficient use of nodes at times such as when computer in the network are idle. In one search configuration, each computer/node in the P2P network contains a part of a search index rather than a centralized index which is more often the case in centralized search engine implementations. As the computers in a P2P network implementation are often a conglomeration of different users' computers, the computers may vary greatly in performance, bandwidth, and available memory to conduct searching and/or hosting an index.

Peer-to-peer search engines are typically implemented with a structured or unstructured network approach. In unstructured peer-to-peer networks, any peer can store any content. There is no specific responsibility between peers and content assigned; therefore at search time all peers need to be queried for content. If the search is limited to a certain number of peers in an unstructured peer search approach, a high probability exists that the results will be incomplete.

In structured peer-to-peer networks, each computer is responsible only for a specific fraction of the content. Therefore at search time it is possible to limit search activities only to those peers that store content related to the query. One example of a structured peer-to-peer network based on distributed hash tables is shown in FIG. 1B.

Search engines should strive to efficiently handle to multiword search queries, as few searches conducted by users include only single keywords. Most peer-to-peer search engines which are capable of multi keyword searches (e.g. Boolean queries) operate by intersecting posting lists of the single keywords as shown in FIG. 2. One may appreciate that posting lists include all addresses or pages which contain a specific keyword, and as such, may become extremely large in size. Therefore, the intersection analysis may require extreme memory, processing, and bandwidth resources to accomplish in a timely fashion. In FIG. 3, a slight improvement is shown where one large posting list is transferred for the keyword "Acid" from Peer 2 to a network node with the longest posting list (the list for "Flower" stored at Peer 1) where the intersection analysis occurs. The results are then transferred from Peer 1 to Peer 3 where a user may review them.

Both methods shown in FIG. 2 and FIG. 3 are inefficient for distributed search, as transferring huge posting lists requires excessive time and bandwidth. To guarantee complete results for two search terms with each 1 billion results at two separate peers, the transfer of at several gigabytes would be required. Even when compressed by compression utilities by factor of 10, the data transfer for a single search is still infeasible. Therefore, the existing approaches are limited to either slow search engines or incomplete results, even when inverse indexes have been utilized to obtain some level of efficiency. Therefore, a need exists for a space efficient distributed index searching system that supports timely and complete search results in a P2P implementation.

SUMMARY OF THE INVENTION

There are provided methods and systems for efficient search in a peer-to-peer network topology. In various embodiments, search methods and systems provide for response times and network traffic that are independent from the number of query terms, thereby producing constant run-time searches and bandwidth hits in a P2P network search implementation. By distributing inverse indexes between peers, and storing with each inverse index a Bloom filter populated with selected keywords, multi-term search and analysis can be conducted on one network node without requiring exchange of posting lists between various network nodes.

In one embodiment, the Boolean intersection of multiple keywords is done locally at a single peer. This allows fast Boolean queries without intersecting long posting lists from different keywords (located at different peers). Using a distributed reverse index, in the posting list of a keyword, for every contained document entry there are selected words of that document stored into a Bloom filter. As those of skill in the art are aware, Bloom filters are well-known space-efficient probabilistic data structures that are used to test whether an element is a member of a set. Set members can be easily added, and such addition does not increase required storage unless the Bloom filter configuration is changed. Bloom filters also have the unusual property that the time needed to either add items or to check whether an item is in the set is a fixed constant, O(k), completely independent of the number of items already in the set.

However, if one wants to determine not only membership within a set, but also another characteristic about an item, a Bloom Filter is insufficient, so the present invention associates the use of a bloom filter with an inverse index within a network node. Therefore, the use of this data structure with embodiments of the present invention provides advantages in storage size and efficiency in checking set membership. In one aspect, within a posting list of a primary keyword embodiments of the present invention check all documents to determine whether they contain all selected secondary keywords, thereby supporting return of the final search results.

In one embodiment, a system implementation includes a peer network node in a provided peer-to-peer network, where the network is connected to the peer network node and is configured to interoperate with the peer network node. The peer network node includes indexing logic for executing software to parse a document into keywords in a search term list; rank order the keywords within the search term list; and for each of the rank-ordered keywords in the search term list: identify the rank-ordered keyword as a primary keyword; determine a unique node identifier corresponding to a hosting node in the peer network, the hosting node configured to: store an inverted index entry including the primary keyword and an identifier corresponding to the document; and store a string in a Bloom filter data structure stored on the hosting node; identify one or more secondary keywords in the search term list; store the primary keyword and the document identifier in the inverted index stored in the hosting node; and store the one or more secondary keywords in the Bloom filter data structure. The logic may include a computer configured with a processor coupled to: a memory, a display, a user interface, and a network interface. In various embodiments, all terms from the document are rank ordered and used as separate primary keywords within the search term list, and the rank ordering may follow any desired scheme such as an alphanumeric order. The keywords may be changed in case to lower case and duplicates removed from the search term list. To promote search efficiency, common stop words (such as "and, or, he, she, it . . . ") may be removed from the search term list. Further, one or more secondary keywords may be stored in the Bloom filter data structure if they are of lower rank order than the primary keyword.

In another aspect of the indexing embodiment, determining a unique node identifier corresponding to a hosting node in the peer network further includes obtaining a hash value of the primary keyword and determining a closest unique node identifier to that hash value. In yet another aspect, the primary keyword may contain multiple keywords, and the software may determines a theoretical distance of one or more secondary keywords from the primary keyword. This distance may represent any desired criterion such as an abstract measure of "closeness" to between a plurality of keywords; such distance value may be stored in the Bloom filter data structure. In another aspect of an indexing embodiment, the primary keyword stored in the inverted index further includes multiple keywords. Also, determining a unique node identifier corresponding to a hosting node in the peer network may be accomplished by any desired approach such as determining which node in the peer-to-peer network stores an inverted index containing primary keyword that has a plurality of keywords within the primary keyword.

There is also provided a method for indexing a document to be searched within a peer-to-peer network architecture, the method comprising: parsing a document into keywords in a search term list; ranking order the keywords within the search term list; and for each of the rank-ordered keywords in the search term list: identifying the rank-ordered keyword as a primary keyword; determining a unique node identifier corresponding to a hosting node in the peer network, whereby the hosting node: stores an inverted index entry including the primary keyword and an identifier corresponding to the document; and stores a string in a Bloom filter data structure stored on the hosting node; identifying one or more secondary keywords in the search term list; storing the primary keyword and the document identifier in the inverted index stored in the hosting node; and storing the one or more secondary keywords in the Bloom filter data structure. The terms from the document may be further processed in any desired manner, such as rank ordering (such as by alphanumeric order) all terms from the document and using all terms as separate primary keywords within the search term list, changing case of keywords within the search term list to lower case; removing duplicate keywords from the search term list, and removing stop words from the search term list. To promote storage efficiency and processing speed, one or more secondary keywords may be stored in the Bloom filter data structure if they are of lower rank order than the primary keyword.

The primary keyword may contains multiple keywords in various embodiments. A measure of closeness such as a theoretical distance may be determined between one or more secondary keywords from the primary keyword, and the distance indicator may be stored in the Bloom filter data structure.

In one embodiment of an indexing method, determining a unique node identifier corresponding to a hosting node in the peer network further includes obtaining a hash value of the primary keyword and determining a closest unique node identifier to that hash value. Further, determining a unique node identifier corresponding to a hosting node in the peer network may further include determining which node in the peer-to-peer network stores an inverted index containing primary keyword that has a plurality of keywords within the primary keyword.

There is also provided a search system including a peer network node in a provided peer-to-peer network, where the network is connected to the peer network node and is configured to interoperate with the peer network node. The peer network node includes searching logic for executing software to obtain a primary keyword from a search string provided by a user; obtain one or more secondary keywords from the search string; determine a unique node identifier corresponding to a hosting node in the peer network, wherein the hosting node stores: an inverted index including the primary keyword and a reference identifier to a document that contains the primary keyword; and a bloom function data structure corresponding to one or more related strings within the document; and wherein the software determines whether the one or more secondary keywords are present within the document by determining whether the one or more secondary keywords have been stored within the Bloom function data structure. The logic may comprised any desired system elements, such as a computer configured with a processor coupled to: a memory, a display, a user interface, and a network interface.

In various embodiments of the search system, the logic is further configured to format a report to a user, the report comprising a list of addresses containing documents corresponding to at least one of: the primary keyword; and the one or more secondary keywords stored within the Bloom function data structure.

Additional aspects of the search system include obtaining the primary keyword by rank ordering search terms from the search string by a predetermined rank order criterion and selecting the highest rank-ordered search term as the primary keyword. The rank order criterion may be any desired ordering system such as alphanumeric order. Keywords within the search string may also be processed to enhance search efficiency; aspects include comprising changing case of keywords within the search string to lower case; removing duplicate keywords from the search string; and removing stop words from the search string.

Keywords may or may not be searched from the Bloom filter for any desired reason. In one embodiment, secondary keywords are searched in the Bloom filter data structure if they are of lower rank order than the primary keyword, and in another embodiment, the software further determines the existence of a plurality of all secondary keywords in the Bloom function data structure. The search system may further assess a closeness of keywords, and in one aspect, the software further determines that the distance is within a predetermined keyword distance, and in an additional aspect, the software further determines the existence of all distance indicators for all secondary keywords from the primary keywords in the bloom function data structure. Further, the primary keyword stored in the inverted index may includes multiple keywords.

In one embodiment of a searching system, determining a unique node identifier corresponding to a hosting node in the peer network further includes obtaining a hash value of the primary keyword and determining the closest unique node identifier to that hash value. Additionally, determining a unique node identifier corresponding to a hosting node in the peer network further includes determining which node in the peer-to-peer network stores an inverted index containing primary keyword that has predetermined multiple keywords within the primary keyword.

There is also provided a method for searching for one or more documents indexed in a peer-to-peer network architecture, the method comprising: obtaining a primary keyword from a search string; obtaining one or more secondary keywords from the search string; determining a unique node identifier corresponding to a hosting node in the peer network, wherein the hosting node stores: an inverted index including the primary keyword and a reference identifier to a document that contains the primary keyword; and a bloom function data structure corresponding to one or more related strings within the document; and wherein the software determines whether the one or more secondary keywords are present within the document by determining whether the one or more secondary keywords have been stored within the Bloom function data structure. An aspect includes formatting a report to a user, the report comprising a list of addresses containing documents corresponding to at least one of: the primary keyword; and the one or more secondary keywords stored within the Bloom function data structure.

The primary keyword may be obtained by rank ordering search terms from the search string by a predetermined rank order criterion and selecting the highest rank-ordered search term as the primary keyword. Any desired criterion may be used such as alphanumeric order. In embodiments of the present method, keywords within the search string may also be processed to enhance search efficiency; aspects include comprising changing case of keywords within the search string to lower case; removing duplicate keywords from the search string; and removing stop words from the search string. In one embodiment, secondary keywords are searched in the Bloom filter data structure if they are of lower rank order than the primary keyword.

In another embodiment of methods for searching in the present invention, determining a unique node identifier corresponding to a hosting node in the peer network further includes obtaining a hash value of the primary keyword and determining the closest unique node identifier to that hash value. Additionally, determining a unique node identifier corresponding to a hosting node in the peer network further includes determining which node in the peer-to-peer network stores an inverted index containing primary keyword that has predetermined multiple keywords within the primary keyword.

There is also provided a system for indexing and searching using keyword combination based partitioning between peers. One embodiment of such a system includes a peer network node; a provided peer-to-peer network connected to the peer network node and configured to interoperate with the peer network node; a means for indexing documents for searching, the indexing performed on keyword combinations and partitioned between multiple nodes in the network; and a means for searching for the indexed documents by multiple keyword combinations indexed across multiple nodes in the network. An additional embodiment of such a system includes a peer network node in a provided peer-to-peer network, where the network is connected to the peer network node and is configured to interoperate with the peer network node. The peer network node includes logic for executing software to: parse a document into separate keywords in a search term list; rank order the keywords within the search term list; for each of the rank-ordered keywords in the search term list: (i) create a list of addresses referring to one or more web pages that include at least one instance of the rank ordered keyword; (ii) rank order the list of addresses by relevance; and (iii) reduce the list of addresses is to k-most relevant addresses, where k is a predetermined number; create a set of query index terms from the search term list, the set of index query terms comprising at least one of a keyword from the search term list and a combination of keywords from the search term list; remove from the set of query index terms at least one combination of keywords that represents a shorter keyword combination; and for each of the remaining query index terms in the set: (i) identify the query index term as a primary query index term; determine a unique node identifier corresponding to a hosting node in the peer network, the hosting node configured to: store an inverted index entry including the a primary query index term and identifiers corresponding to the to k-most relevant addresses for that query index term; and store a string in a Bloom filter data structure stored on the hosting node; (ii) identify one or more secondary query index terms; (iii) store the a primary query index term and identifiers corresponding to the to k-most relevant addresses for that query index term in the inverted index of the hosting node; and (iv) store the one or more secondary query index terms and their respectively associated k-most relevant addresses in the Bloom filter data structure. The logic may include any appropriate hardware or resource such as a processor coupled to: a memory, a display, a user interface, and a network interface.

During indexing, the terms from the document may be rank ordered in any order such as alphanumeric order; and all terms may be used as separate primary keywords within the search term list. Various processing of the keywords within the search term list may occur, such as changing case of keywords within the search term list to lower case; forming keywords in the search term list to root stem words; removing duplicate keywords from the search term list; and removing stop words from the search term list. In one aspect, one or more secondary keywords may be stored in the Bloom filter data structure if they are of lower rank order than the primary keyword.

In one implementation of a multi-peer search and indexing system, determining a unique node identifier corresponding to a hosting node in the peer network further includes obtaining a hash value of the primary keyword and determining a closest unique node identifier to that hash value. In another aspect, combinations of keywords are created which do not include shorter keyword combinations with less than the top-k most relevant pages stored in the index.

One embodiment of the multi-peer indexing and searching system includes obtaining a primary keyword from a search string provided by a user; obtaining one or more secondary keywords from the search string, the secondary keywords comprising at least one of a single word or a combination of words from the search string; creating a limited search set comprising one or more keyword combinations from the primary and secondary keywords, wherein each of the respective primary and secondary keyword elements have the top-k most relevant pages stored in the inverted index; identifying one or more hosting nodes of the peer-to-peer network that store in the inverted index at least one keyword from the limited search set; and for each of the identified hosting nodes: (i) if the keyword stored in the inverted index of the hosting node is a single word, format a report for a user containing addresses of all documents that are referenced by that keyword in the inverted index; (ii) if the keyword in the inverted index of the hosting node comprises a plurality of words, format a report for a user containing addresses of all documents that are referenced by the Bloom filter data structure entry for that keyword.

It is to be understood that the descriptions of this invention herein are exemplary and explanatory only and are not restrictive of the invention as claimed.

BRIEF DESCRIPTION OF THE DRAWINGS

FIG. 1B illustrates a prior art distributed inverted index in a P2P network implementation using the distributed hash table approach.

FIG. 7 illustrates an example reduction scheme for storing necessary keywords by rank order.

FIG. 13 illustrates an example of an indexing approach using keyword combination-based partitioning in accordance with an embodiment of the present invention.

DESCRIPTION OF THE PREFERRED EMBODIMENTS

Reference will now be made in detail to the present exemplary embodiments of the invention, examples of which are illustrated in the accompanying drawings.

It is to be understood that the methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, FLASH memory, RAM, ROM, DVD, CD ROM, etc.) and executable by any device or machine comprising suitable architecture, such as a general purpose digital computer having a processor, memory, and input/output interfaces. It is to be further understood that, because some of the constituent system components and process steps described herein are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1A:
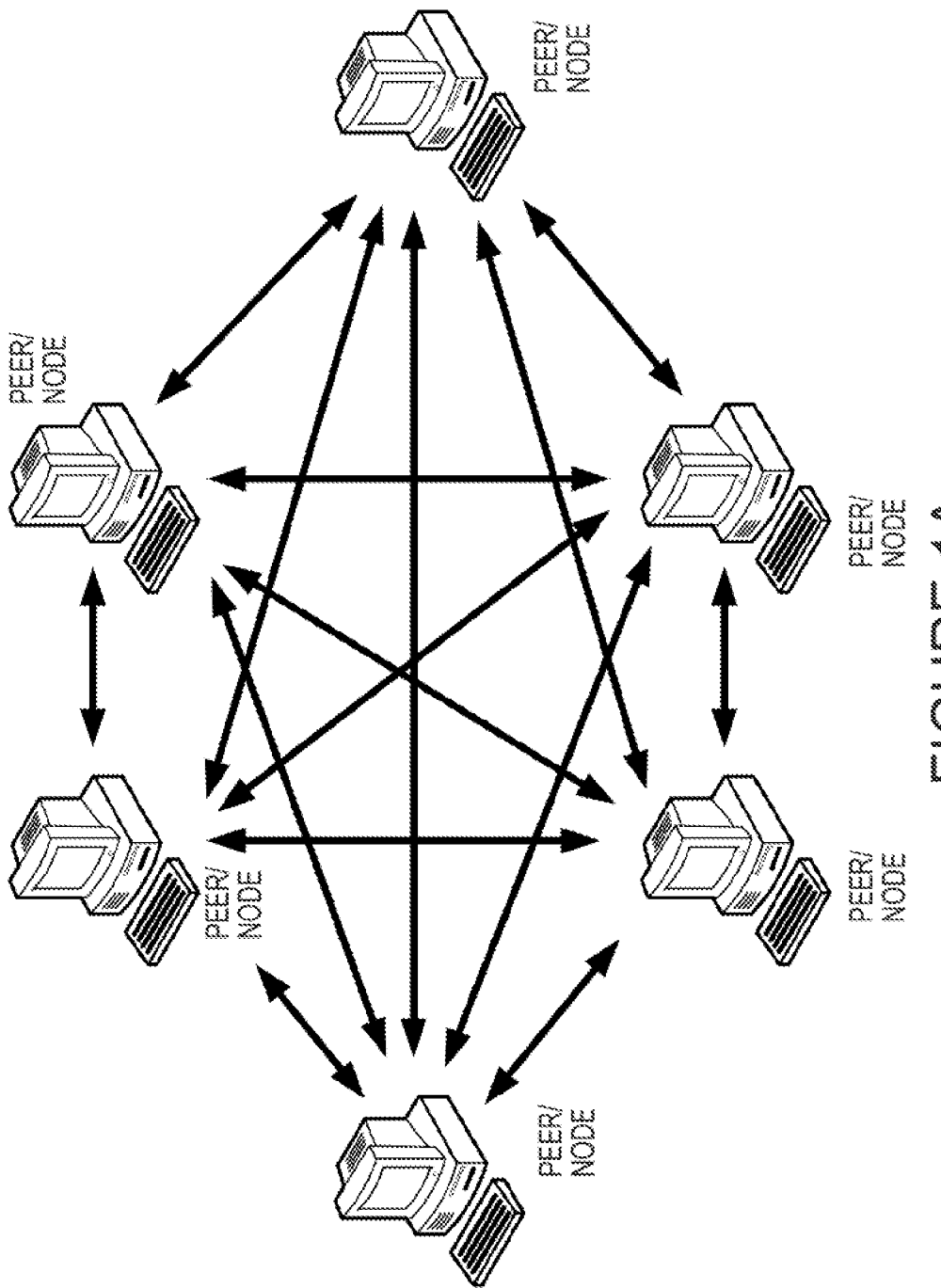
FIG. 1A shows a depiction of prior art peer-to-peer network topology.
Figure 2:
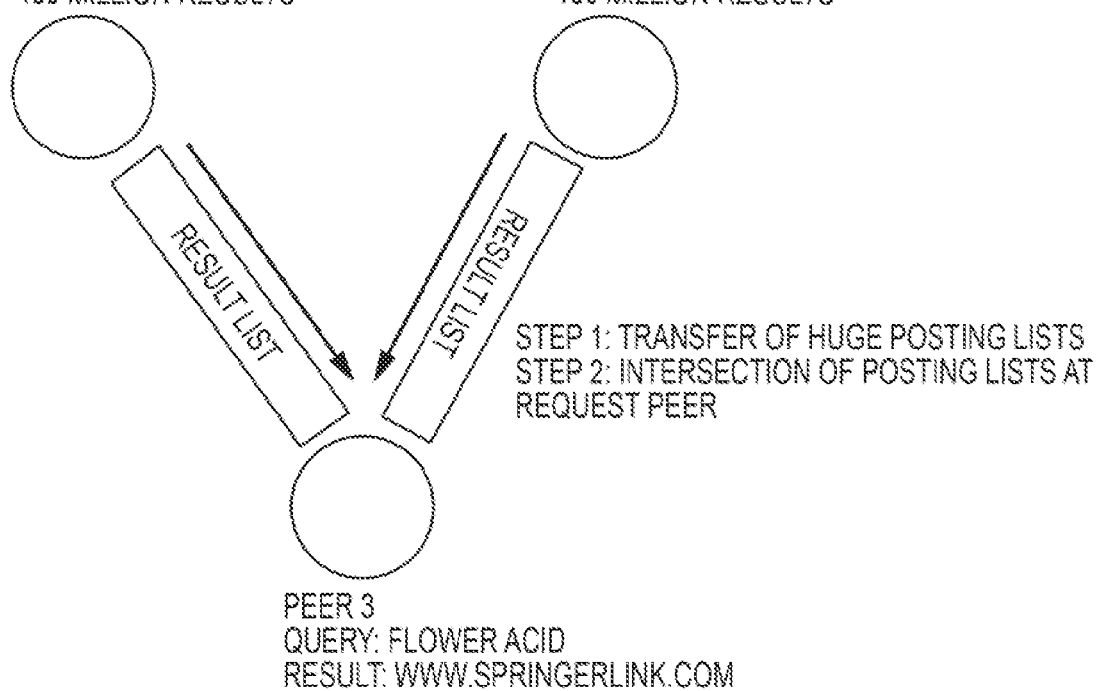
FIG. 2 shows a prior art approach to a Boolean search query in a P2P network implementation.
Figure 3:
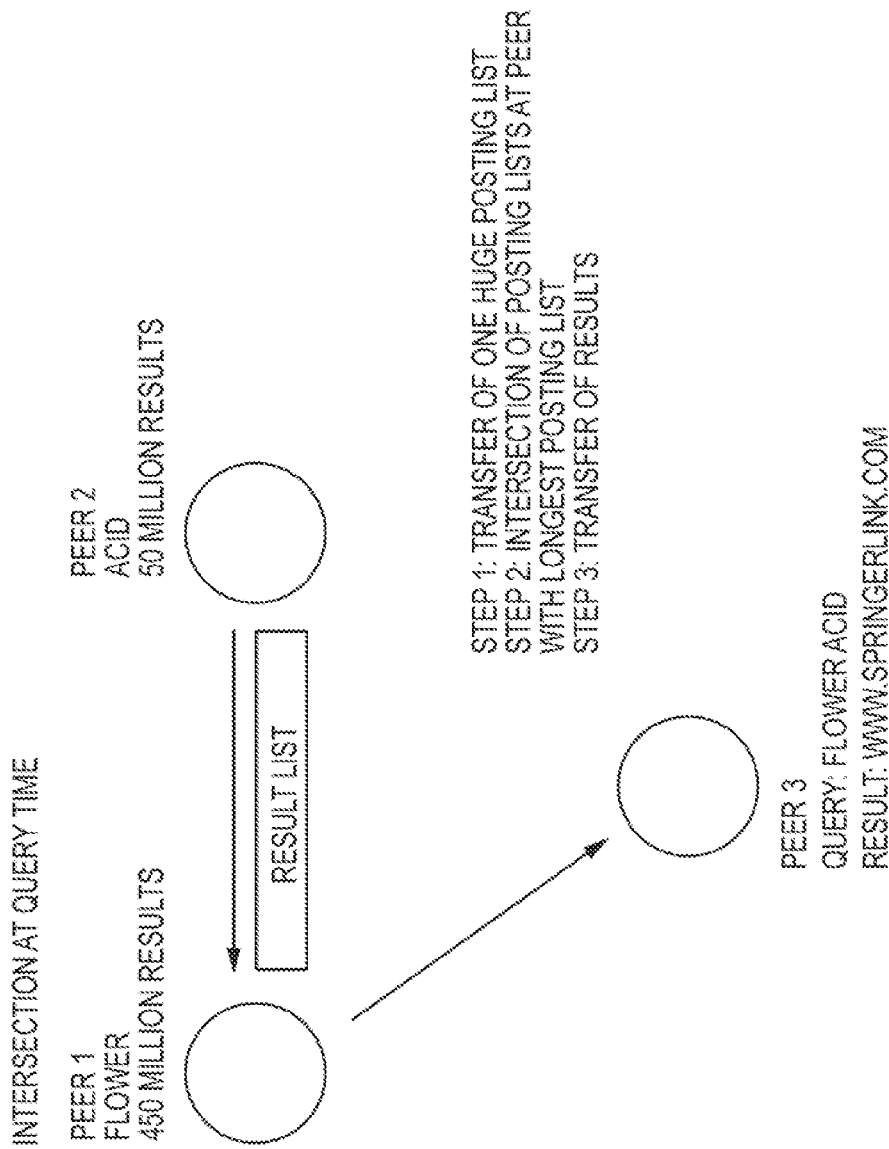
FIG. 3 illustrates another approach to a Boolean search query in a P2P network implementation.
Figure 4:
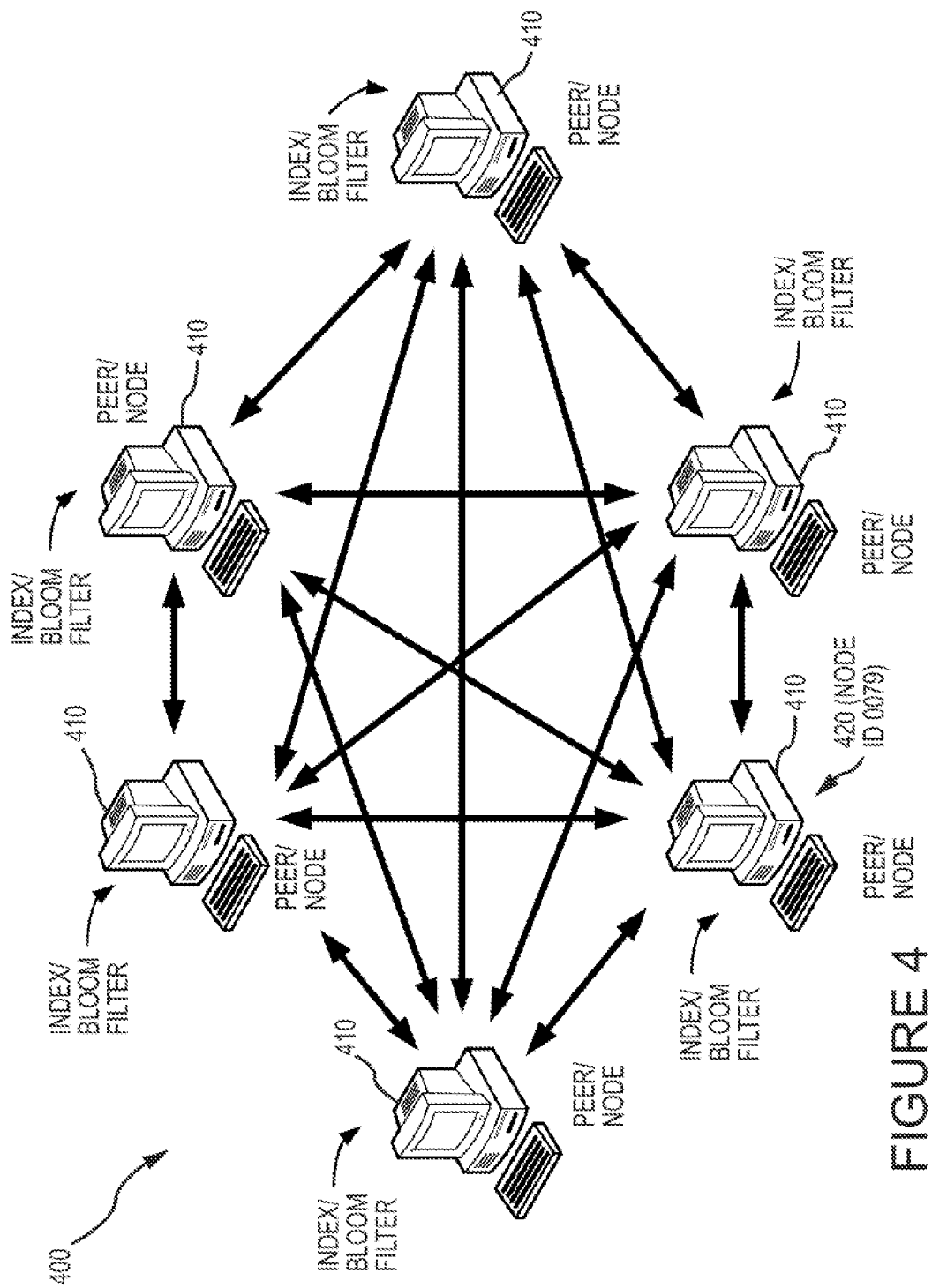
FIG. 4 illustrates a system block diagram of the present invention.

There is provided an efficient indexing and searching system using a distributed inverted index in a peer-to-peer (P2P)

network environment. One embodiment of the system 400, shown in FIG. 4, shows a plurality of network nodes/peers 410 interconnected through a network. Each node or peer may represent a computer configured with a processor coupled to a memory, a display, a user interface, and a network interface, and those of skill in the art appreciate that such a node or peer may also be a PDA, a mobile phone, a smart phone, an appliance, or any other device capable of storing, processing, and exchanging data with a P2P network. On each node, an inverted index is stored that references storage locations for documents within the network.

Through various improvements of embodiments of the present invention, searching and processing of multiple search terms may efficiently take place completely on a single node of a P2P network, even when the inverse index to documents is distributed among multiple nodes/peers in the network. At least a portion of an inverse index is shown stored on each node 410 along with a Bloom filter data structure, although those of skill in the art may appreciate that certain nodes may be connected to the network that do not have an index and/or bloom filter, and/or may not be configured to participate in distributed searching and indexing.

Figure 5:
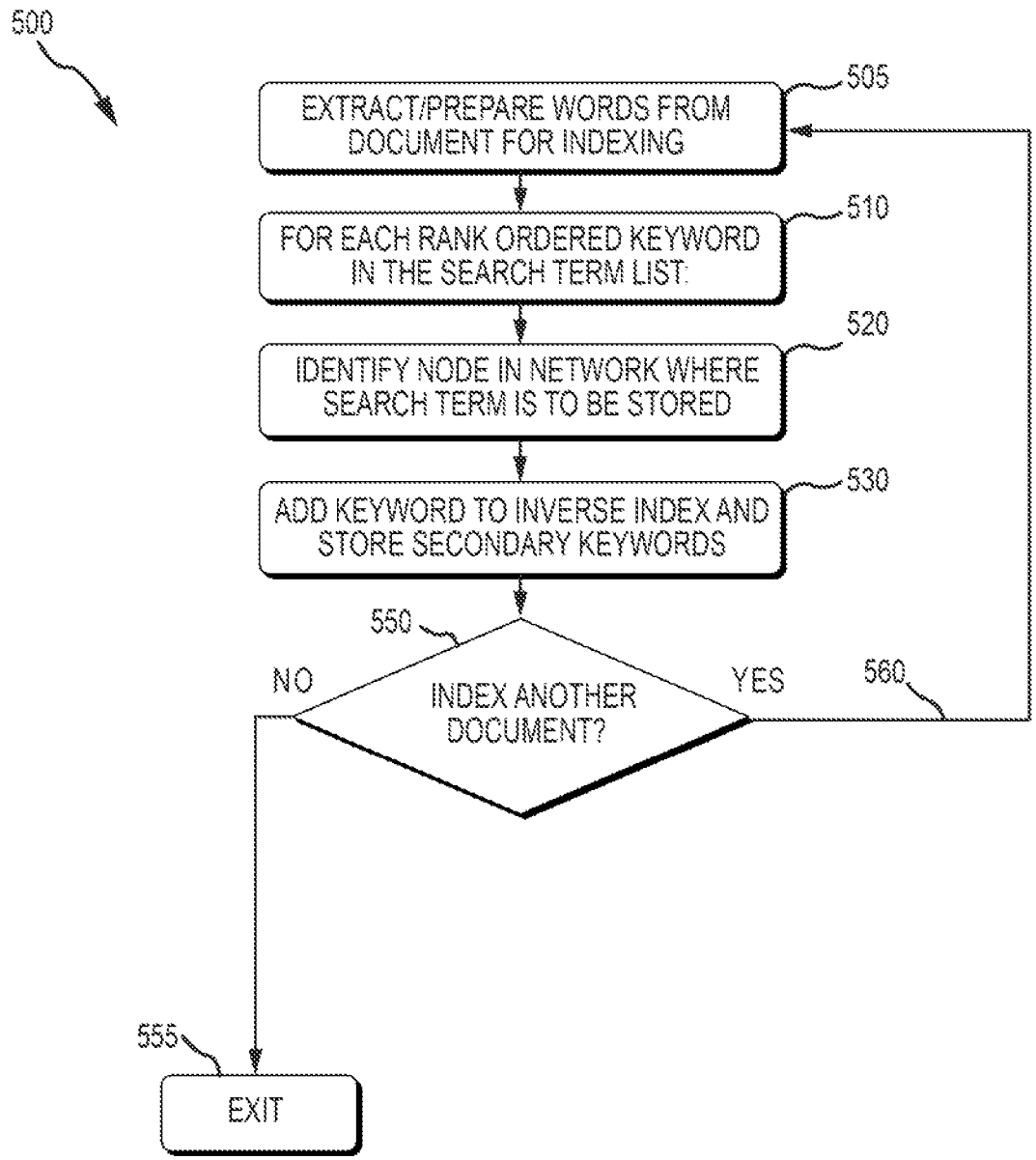
FIG. 5 shows a flow diagram for an indexing method of the present invention.
Figure 6:
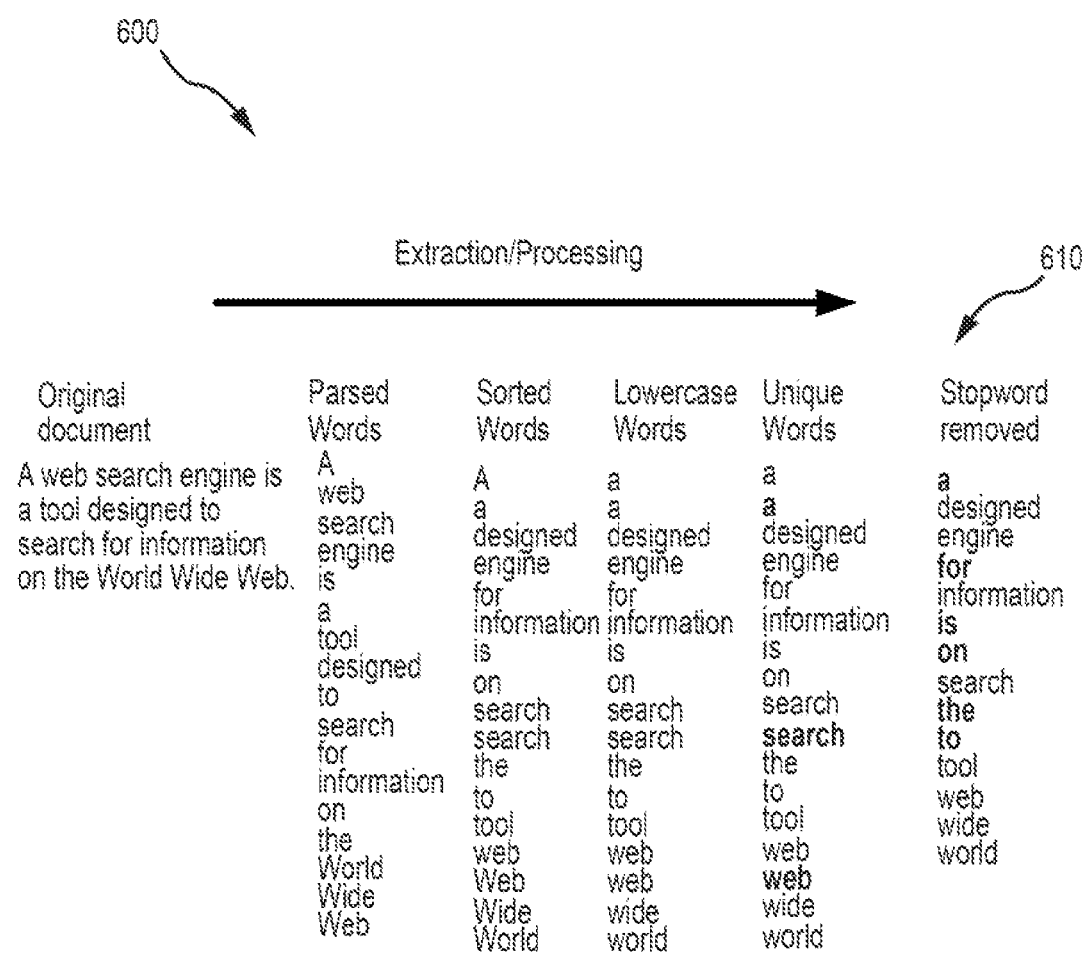
FIG. 6 shows an example extraction and processing of terms for indexing from a source document.

A comprehensive search system and method of the present invention comprises the aspects of indexing documents available to a P2P network, and then searching the indexes and related data structures to efficiently identify documents containing search keywords or Boolean search strings provided by a user. A flow diagram 500 is shown in FIG. 5 that illustrates aspects of an indexing method of the present invention, and may be used in conjunction with the P2P system 400 shown in FIG. 4. Initially, a document is identified for indexing by a node 410 of the network. Potential keywords are extracted/parsed 505 from the document, and the list of words prepared 505 for indexing by separating them into separate words, sorted the words, transforming the words to lower case, and removing double word entries and stop words (e.g., frequent terms as and, or, he, it, etc.). FIG. 6 illustrates, from right to left, a processing of the words extracted from a source document being indexed, with the resulting prepared list of keywords shown in the rightmost column 610.

For each keyword in the rightmost column 610 (see step 510), beginning top down, an appropriate network node 410 is identified 520, and the keyword added 530 to its inverse table along with an identifier of the document (such as its URL or web address). The appropriate network node may be determined by any appropriate means, such as performing a hash function on the primary keyword and determining the closest network node unique id to the output of that hash function. For example the first word in column 610 is "designed" and say a hash of "designed" gives a value of 0077. This value is compared to various unique node ID's of the various nodes 410, and the closest match is found to determine which inverse index requires update (say, for example, node 420, which happens to have a unique node ID of 0079, and other node ids for nodes in the network are farther away numerically than the value "2"). In the inverse index/posting list of a primary keyword, for every contained document entry there are the contained words (secondary keywords) of that document stored. This allows fast Boolean searches (e.g. AND) local at the peer, without intersecting long posting lists from different keywords (located at different peers). However, in an embodiment, not all contained keywords are stored, but only those which are in alphabetical order subsequent to the primary keyword of the posting list (see the example in FIG. 7); this saves half of the required index space. If another document is to be indexed 550, the process continues with extraction and preparation 505, otherwise the index process terminates 555.

Figure 8:
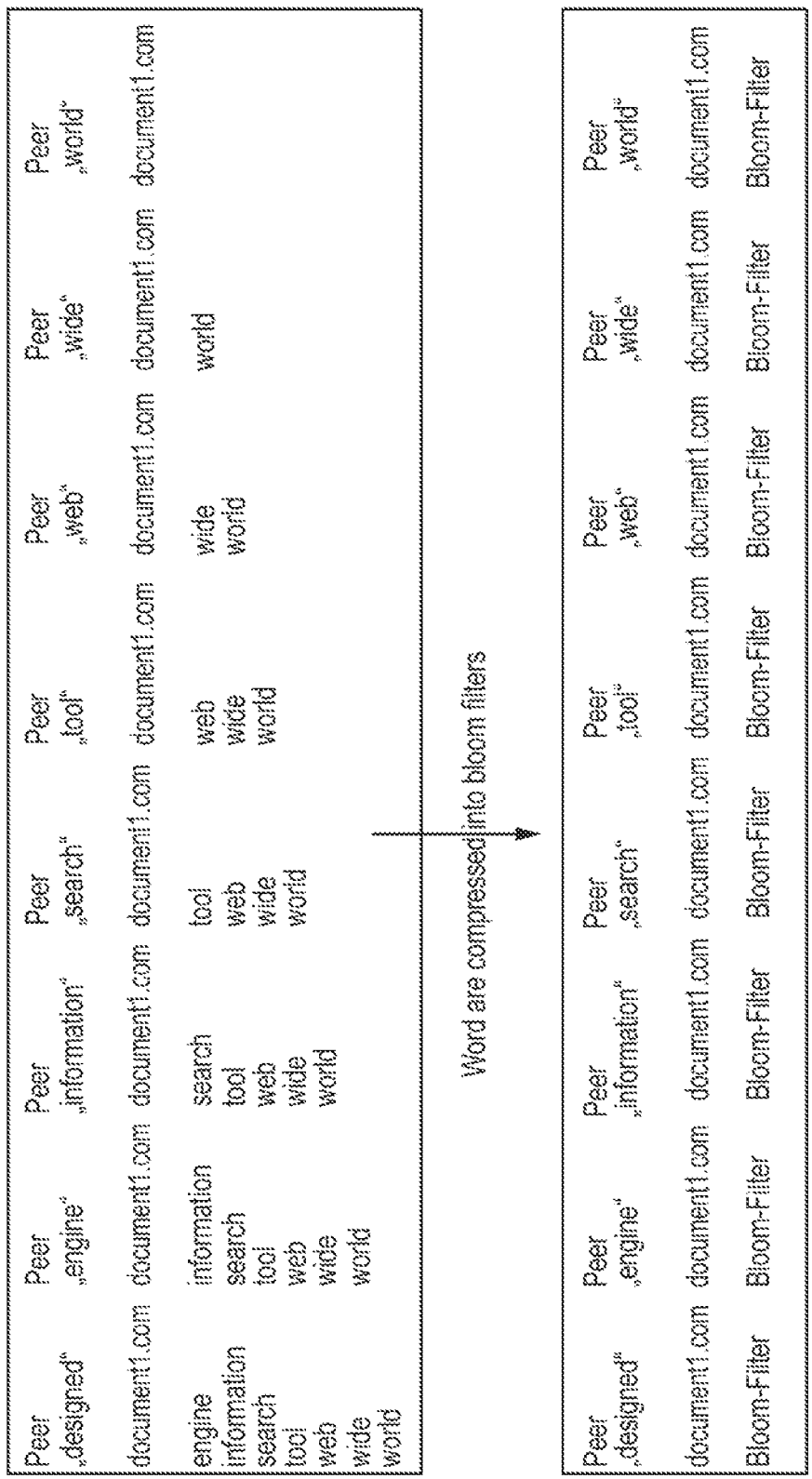
FIG. 8 shows an example of compression of document index words into term in a Bloom filter.

The keywords contained in a web page referred to by the primary key word are stored as entries in bloom filter data structure in the posting list (see the example in FIG. 8). This provides a large compression gain and efficiency in lookup for secondary keywords in a search. The use of Weighted Bloom Filters further optimizes the required index space according to the occurrence frequency of keyword in queries. In an additional one aspect, a sliding window is being utilized around the primary keyword; only secondary keywords within a certain proximity to the primary keyword are stored. This again may reduce the required index space.

Figure 9:
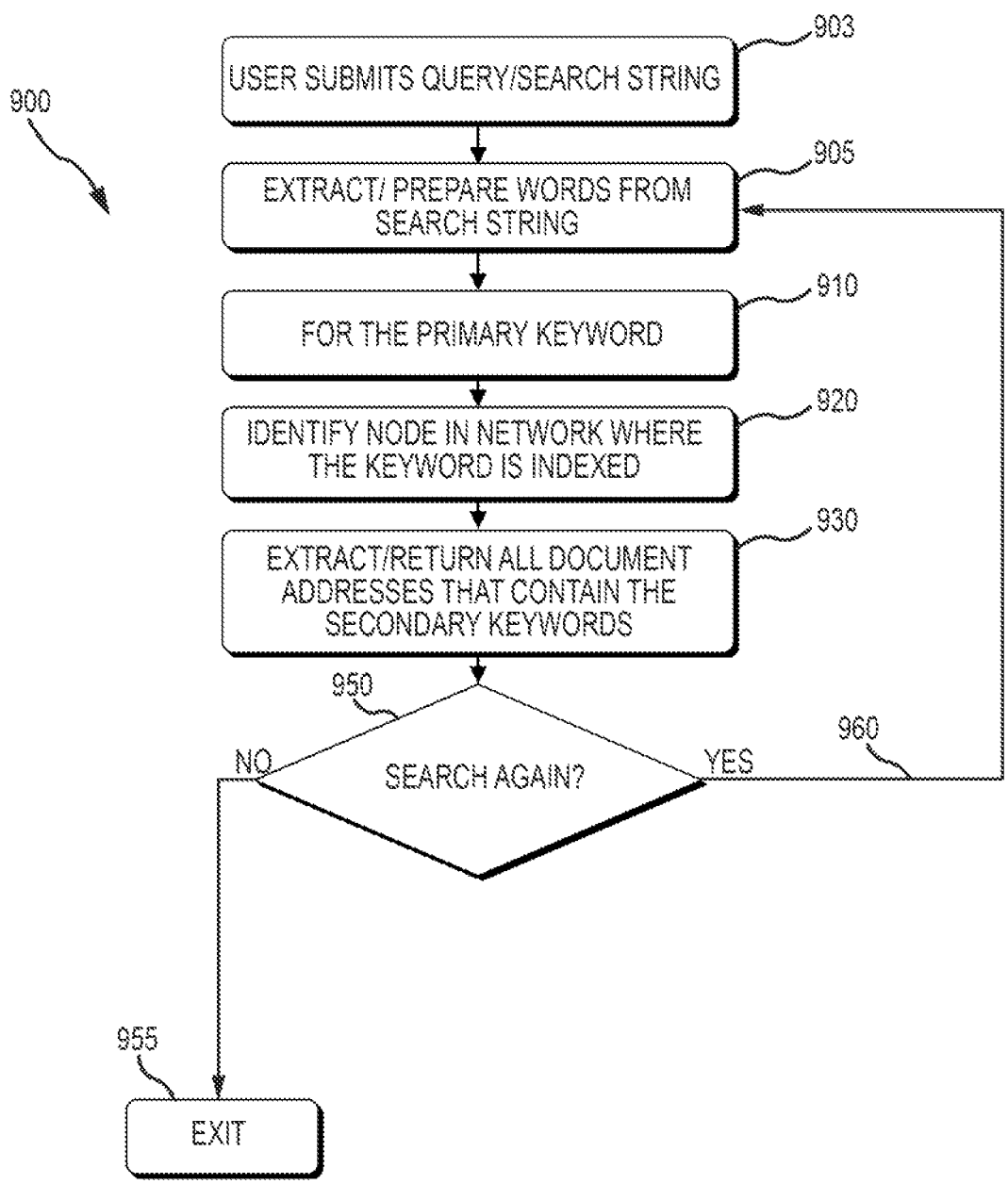
FIG. 9 illustrates a flow chart for a search method of the present invention.
Figure 10:
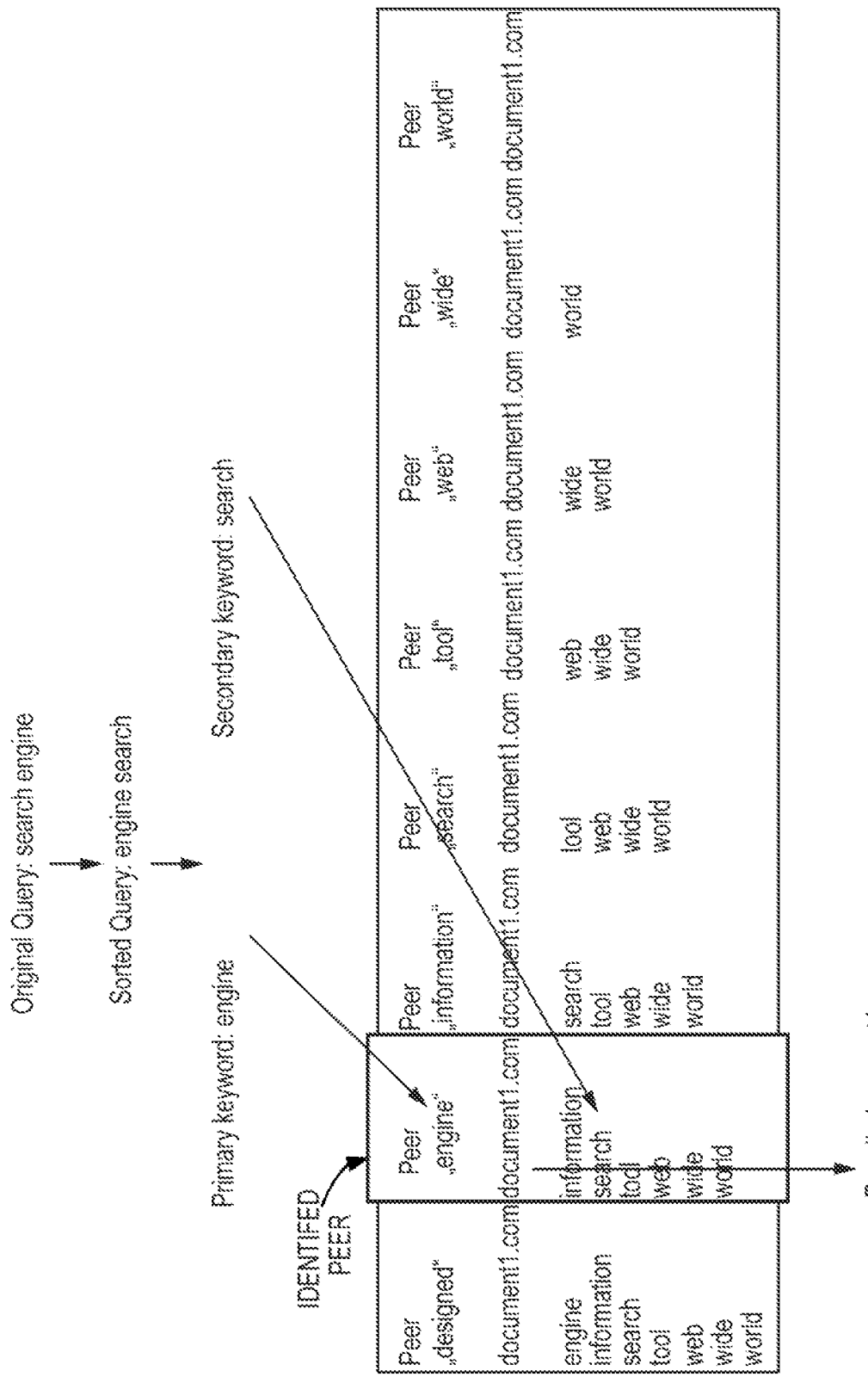
FIG. 10 illustrates an example location of an index on an identified peer and lookup and returning of a document address to a user.

A flow diagram 900 is shown in FIG. 9 that illustrates aspects of an searching method of the present invention, and may be used in conjunction with the P2P system 400 shown in FIG. 4. Initially, a user submits 903 to the distributed search system a query in the form of a search string. The query is parsed into separate words, the words are sorted alphabetically, transformed to lower case, double word entries and stop words (frequent terms as and, or, he, it . . . ) are removed 905, producing a processed keyword list, an example of which is shown in FIG. 10, where the user submitted the search string "search engine" to the distributed search system 400. The rank order determines the primary keyword, the other keywords are taken as secondary keywords—in the example on FIG. 10, "engine" was determined to be the primary keyword from the search string and "search" was determined to be the secondary keyword. Next, the node is identified 920 where the term "engine" is in an index, through a hashing approach described above. From the located node's inverse index/posting list, all documents are identified that contain all of the secondary keywords 930, and a report formatted and sent to the user with the locations of the documents and/or other search results. In the example FIG. 10, a hash of the primary keyword "engine" produced a closest match to the node labeled "Identified Peer," and the secondary keyword "search" was located in "document1," whose address was returned to the user.

Phrase indexing and searching is also supported by embodiments of the present invention. In various embodiments of the present invention phrase search response time and consumed network traffic is independent from the number of query terms. The intersection of multiple keywords is done locally at a single peer. This allows fast phrase queries without intersecting long posting lists from different keywords (located at different peers). Nevertheless also for a huge index size the top-k most relevant results are assured.

Using a distributed reverse index, in the posting list of a keyword for every contained document entry there are selected words of that document stored into a bloom filter. Within a posting list of a primary keyword, all documents are checked to determine if they contain all selected secondary keywords of the query at a specific distance from the primary keyword to determine the final results.

Figure 11:
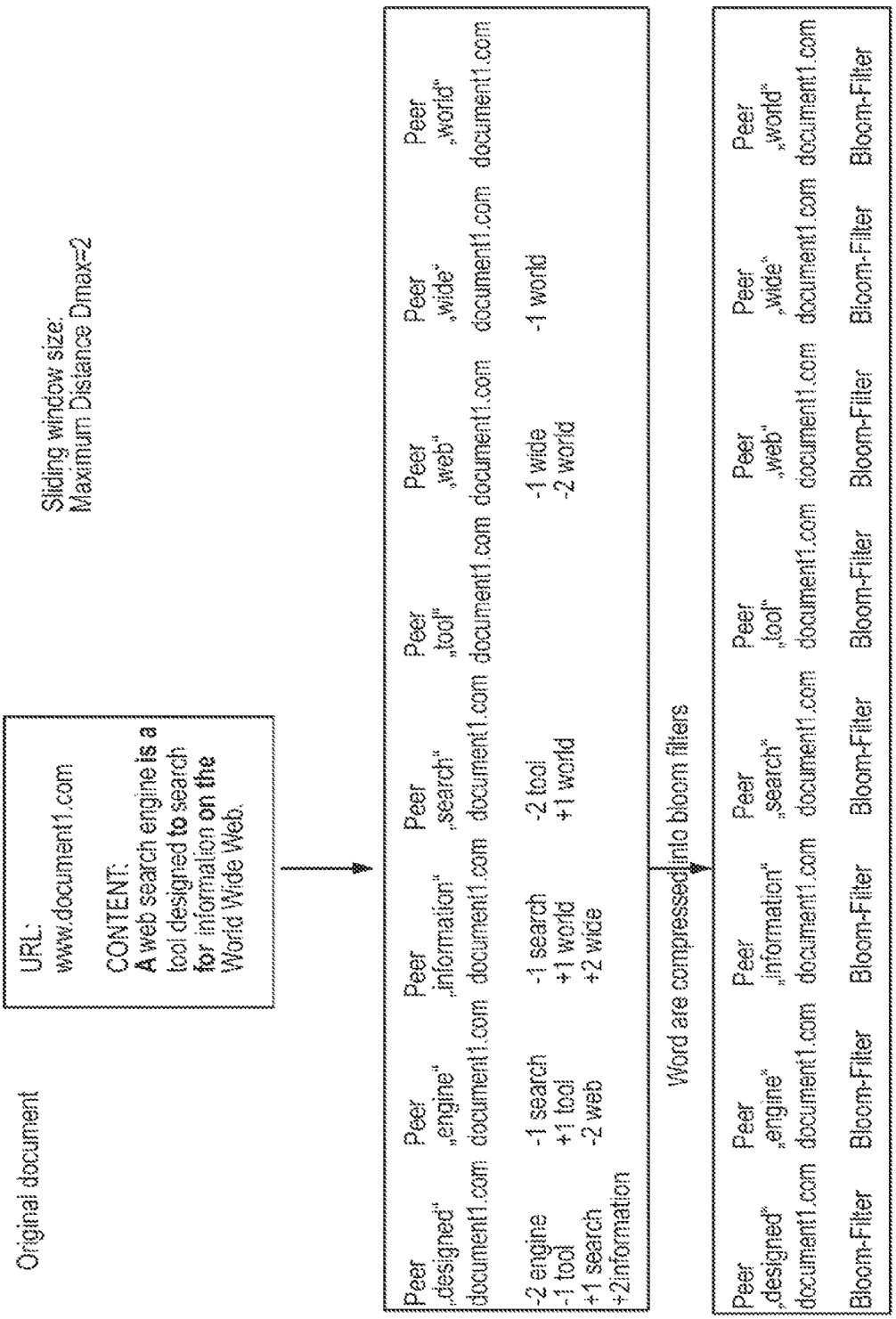
FIG. 11 illustrates an example of phrase indexing in accordance with an embodiment of the present invention.

In an indexing embodiment, to support phrase search during indexing for each word (primary keyword) all surrounding words (secondary keyword) within a maximum distance Dmax are stored together with their relative position to the primary keyword (see the example in FIG. 11). Not all secondary keywords are necessarily stored, but only those which are in alphabetical order subsequent to the primary keyword. The combination of secondary keyword and its relative position to the primary keyword is then added to the Bloom filter of each document.

Figure 12:
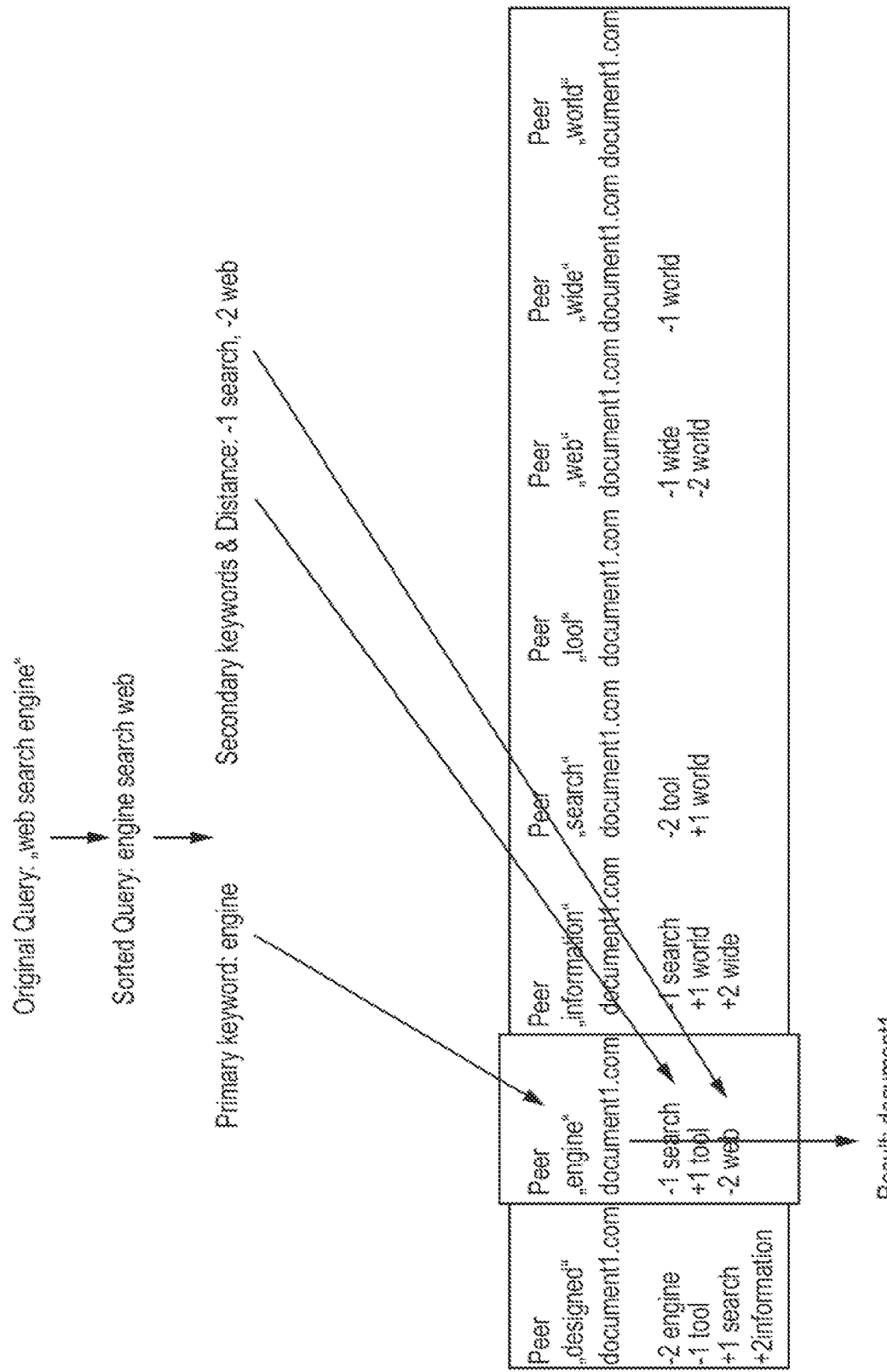
FIG. 12 illustrates an example of searching with indexed phrases in accordance with an embodiment of the present invention.

Phrase searching is likewise provided by embodiments of the present invention. The keywords of the phrase search query are ordered alphabetically. The ranked keyword is taken as primary keyword, the other keywords are taken as secondary keywords (see the example in FIG. 12). A combination of each secondary keyword with its relative position to the primary keyword is created. Then the peer responsible for the primary keyword is selected in a manner such as the hashing approach previously described. From the inverse index/posting list in the identified node, all documents are selected that contain all secondary keyword/position combinations, and addresses to those documents are provided to the user as final results.

Additionally, aspects of the present invention provide for keyword combination-based index partitioning. With the large amount of information available in the Internet today, significant benefits are provided by partitioning the index across diverse computers, especially since few computers may store all the information needed nor have sufficient processing speed to conduct an efficient search.

In an indexing aspect of a embodiment of the present invention addressing keyword combination-based index partitioning, the partitioning of the index across multiple nodes/peers is based on keyword combinations. For each keyword, only the top-k most relevant document addresses are stored, thereby only the n most relevant pages of each domain are taken, where n and k are predetermined integers based on desired performance of the system). Aspects of this approach provide for domain collapsing, which delivers only n most relevant results per domain during search. These measures reduce the required index space dramatically and eliminate the problem of distributing long posting lists over several peers, which would compromise performance of the distributed hash table (DHT) principle. FIG. 10 shows an example, were keyword combinations are created, and to limit the possibly huge term space that may result from longer possible search strings, combinations are created solely from those keywords from the web page, which have already the top-k most relevant pages stored in the index. Only those keyword combinations are created, which do not contain shorter key word combinations with less then top-k most relevant pages stored in the index. Every server/peer in the index is responsible for a certain range of keyword combinations. The web page address is then stored also to each of the server/peer which are responsible for the generated keyword combination. These steps ensures top-k results for each keyword combination and therefore for each possible query. In additional embodiments, the following steps methods further reduce the number of generated keyword combinations: (1) the number of different terms is reduced by transforming the words to it stems (stemming) and stop words (frequent terms as and, or, he, it . . . ) are removed; and (2) only keywords within sliding window of word distance are used to generate keyword combinations.

In an indexing aspect of a embodiment of the present invention addressing keyword combination-based index partitioning, during search all combinations of the keywords contained in the search string/query provided by the user are generated. Keyword combinations are created solely from those keywords from the query, which have already the top-k most relevant pages stored in the index. On query time, only those servers/peers responsible for the query keyword or keyword combinations are queried. If the query contains of a single keyword, then addresses for all documents of that keyword are returned as result to the user. If the query contains multiple keywords, then server/peer responsible for the query keyword or generated keyword combinations is queried. Addresses for all those documents of that keyword or keyword combination are returned as result, which contain all keywords of the query in their Bloom filter.

The "Keyword combination based partitioning" is combined with the "Time and space efficient Boolean searches in distributed indexes" and "Phrase search for bloom filter compressed index".

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
   a peer network node;
   a provided peer-to-peer network connected to the peer network node and configured to interoperate with the peer network node; and
   wherein the peer network node includes logic for executing software to:
   parse a document into separate keywords in a search term list;
   rank order the keywords within the search term list;
   for each of the rank-ordered keywords in the search term list:
      (i) create a list of addresses referring to one or more web pages that include at least one instance of the rank ordered keyword;
      (ii) rank order the list of addresses by relevance; and
      (iii) reduce the list of addresses to k-most relevant addresses, where k is a predetermined number;
   create a set of query index terms from the search term list, the set of index query terms comprising at least one of a keyword from the search term list and a combination of keywords from the search term list;
   remove from the set of query index terms at least one combination of keywords that represents a shorter keyword combination; and
   for each of the remaining query index terms in the set:
      (i) identify the query index term as a primary query index term;
      determine a unique node identifier corresponding to a hosting node in the peer network, the hosting node configured to:
         store an inverted index entry including the primary query index term and identifiers corresponding to the k-most relevant addresses for that query index term; and
         store a string in a Bloom filter data structure stored on the hosting node;
      (ii) identify one or more secondary query index terms;
      (iii) store the primary query index term and identifiers corresponding to the k-most relevant addresses for that query index term in the inverted index of the hosting node; and
      (iv) store the one or more secondary query index terms and their respectively associated k-most relevant addresses in the Bloom filter data structure.

2. The system of claim 1 wherein the logic is a computer configured with a processor coupled to: a memory, a display, a user interface, and a network interface.

3. The system of claim 1 wherein all terms from the document are rank ordered in alphanumeric order; and
   all terms are used as separate primary keywords within the search term list.

4. The system of claim 1 further comprising changing case of keywords within the search term list to lower case.

5. The system of claim 1 further comprising forming keywords in the search term list to root stem words.

6. The system of claim 1 further including removing duplicate keywords from the search term list.

7. The system of claim 1 further including removing stop words from the search term list.

8. The system of claim 1 wherein the one or more secondary keywords are stored in the Bloom filter data structure if they are of lower rank order than the primary keyword.

9. The system of claim 1 wherein determining a unique node identifier corresponding to a hosting node in the peer network further includes obtaining a hash value of the primary keyword and determining a closest unique node identifier to that hash value.

10. The system of claim 1 wherein combinations of keywords are created which do not include shorter keyword combinations with less than the top-k most relevant pages stored in the index.

11. The system of claim 1 wherein the system is further configured to:

obtain a primary keyword from a search string;

obtain one or more secondary keywords from the search string, the secondary keywords comprising at least one of a single word or a combination of words from the search string;

create a limited search set comprising one or more keyword combinations from the primary and secondary keywords, wherein each of the respective primary and secondary keyword elements have the top-k most relevant pages stored in the inverted index;

identify one or more hosting nodes of the peer-to-peer network that store in the inverted index at least one keyword from the limited search set;

for each of the identified hosting nodes:
  (i) if the keyword stored in the inverted index of the hosting node is a single word, format a report for a user containing addresses of all documents that are referenced by that keyword in the inverted index;
  (ii) if the keyword in the inverted index of the hosting node comprises a plurality of words, format a report for a user containing addresses of all documents that are referenced by the Bloom filter data structure entry for that keyword.

* * * * *